United States Patent
Creech et al.

(10) Patent No.: US 11,209,289 B2
(45) Date of Patent: *Dec. 28, 2021

(54) WIRELESS SYSTEM FOR DETERMINING DISPLACEMENT OF SPINNING COMPONENTS

(71) Applicant: Dana Automotive Systems Group, LLC, Maumee, OH (US)

(72) Inventors: Michael Z. Creech, Ann Arbor, MI (US); Justin S. Davis, Maumee, OH (US); Seth A. Metzger, Monclova, OH (US); Anne M. Adamczyk, Grand Rapids, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 206 days.

This patent is subject to a terminal disclaimer.

(21) Appl. No.: 16/539,427

(22) Filed: Aug. 13, 2019

(65) Prior Publication Data
US 2019/0368897 A1    Dec. 5, 2019

Related U.S. Application Data

(63) Continuation of application No. 15/750,954, filed as application No. PCT/US2016/045704 on Aug. 5, 2016, now Pat. No. 10,422,660.

(Continued)

(51) Int. Cl.
*G01D 5/14* (2006.01)
*F16H 48/08* (2006.01)
(Continued)

(52) U.S. Cl.
CPC ............ *G01D 5/145* (2013.01); *F16H 48/08* (2013.01); *F16H 48/34* (2013.01); *F16H 48/40* (2013.01);
(Continued)

(58) Field of Classification Search
CPC .. G01D 5/00; G01D 5/12; G01D 5/14; G01D 5/142; G01D 5/145; G01D 5/40;
(Continued)

(56) References Cited

U.S. PATENT DOCUMENTS 3,927,339 A  * 12/1975  Paul ....................... B60T 8/329
                                                           310/155
3,947,712 A  *  3/1976  Burckhardt ............. B60T 8/329
                                                           310/168

(Continued)

FOREIGN PATENT DOCUMENTS

EP    1435479    7/2004

OTHER PUBLICATIONS

European Patent Office, The International Search Report with Written Opinion issued in PCT/US2016/045704, dated Nov. 10, 2016; 11 pages, European Patent Office, Rijswijk, Netherlands.

*Primary Examiner* — Hoai-An D. Nguyen
(74) *Attorney, Agent, or Firm* — McCoy Russell LLP (57) ABSTRACT

A wireless system for determining the displacement of spinning components of a differential assembly, including a differential case having a hollow interior space; a differential assembly having an actuator including an electromagnet having a coil, a spinning component selectively engaged with a differential gear arrangement and at least one sensor assembly non-rotatably mounted to the differential case including at least one sensor communicatively coupled to a printed circuit board, a transmitter and a power source. The sensor assembly extends axially and radially within the differential case and at least one sensor is configured to directly sense the axial displacement of the spinning component and the sensor assembly is configured generate a signal representing the axial displacement of the spinning (Continued)

component into a signal that is wirelessly transmitted to a receiver positioned outside the differential case.

20 Claims, 5 Drawing Sheets

Related U.S. Application Data (60) Provisional application No. 62/202,233, filed on Aug. 7, 2015, provisional application No. 62/311,087, filed on Mar. 21, 2016.

(51) Int. Cl.
*F16H 48/34* (2012.01)
*F16H 48/40* (2012.01)
*F16H 48/22* (2006.01)

(52) U.S. Cl.
CPC ........ *F16H 48/22* (2013.01); *F16H 2048/346* (2013.01)

(58) Field of Classification Search
CPC .......... F16H 48/00; F16H 48/08; F16H 48/22; F16H 48/34; F16H 48/346; F16H 48/40; F15B 15/00; F15B 15/20; F15B 15/28; F15B 15/2815; G01B 7/00; G01B 7/14; G05B 2219/37; G05B 2219/37019
USPC .... 324/200, 207.11, 207.13, 207.14, 207.15, 324/207.16, 207.18, 207.2
See application file for complete search history.

(56) References Cited

U.S. PATENT DOCUMENTS

| | | | |
|---|---|---|---|
| 3,996,590 A | 12/1976 | Hammack | |
| 4,163,208 A | 7/1979 | Merz | |
| 4,551,969 A | 11/1985 | Kogiso | |
| 5,111,440 A | 5/1992 | Mathildus | |
| 5,980,256 A | 11/1999 | Carmein | |
| 6,211,667 B1 * | 4/2001 | Volonterio | G01D 5/2216 324/207.16 |
| 7,009,384 B2 * | 3/2006 | Heremans | G01D 5/147 324/165 |
| 7,021,127 B2 | 4/2006 | Schroeder | |
| 7,264,568 B2 | 9/2007 | Ludwig | |
| 7,375,516 B2 * | 5/2008 | Takenaga | B82Y 25/00 324/207.11 |
| 7,471,033 B2 | 12/2008 | Thiesen | |
| 7,528,597 B2 * | 5/2009 | Taylor | G01D 5/202 324/207.15 |
| 7,682,279 B2 | 3/2010 | Donofrio | |
| 7,688,216 B2 | 3/2010 | Mizutani | |
| 8,109,358 B2 | 2/2012 | Dayton | |
| 8,169,311 B1 | 5/2012 | Breed | |
| 8,694,224 B2 | 4/2014 | Chundrlik, Jr. | |
| 8,808,127 B2 | 8/2014 | Seidl | |
| 8,829,696 B2 | 9/2014 | Lesesky | |
| 8,853,870 B2 | 10/2014 | Moss | |
| 8,935,054 B2 | 1/2015 | Mantini | |
| 8,989,956 B2 | 3/2015 | Dunst | |
| 9,182,459 B2 | 11/2015 | Kalathil | |
| 9,304,142 B1 | 4/2016 | Gurganian | |
| 2003/0006761 A1 * | 1/2003 | Hiramatsu | G01D 5/2291 324/207.16 |
| 2005/0259903 A1 | 11/2005 | Takizawa | |
| 2006/0270508 A1 | 11/2006 | Gohl | |
| 2011/0228367 A1 | 9/2011 | Lubianiker | |
| 2012/0116628 A1 | 5/2012 | Clark | |
| 2013/0066587 A1 | 3/2013 | Kalathil | |
| 2015/0109142 A1 | 4/2015 | Mejegård | |
| 2015/0133254 A1 | 5/2015 | Fox | |
| 2015/0204431 A1 | 7/2015 | Cochren | |
| 2016/0094115 A1 | 3/2016 | Okawa | |
| 2019/0070908 A1 | 3/2019 | Tsujita | |

* cited by examiner

WIRELESS SYSTEM FOR DETERMINING DISPLACEMENT OF SPINNING COMPONENTS

RELATED APPLICATIONS

The present application claims the benefit of U.S. Provisional Application Nos. 62/202,233 filed on Aug. 7, 2015 and 62/311,087 filed on Mar. 21, 2016, a PCT Application No. PCT/US2016/045704 filed on Aug. 5, 2016, and is a continuation of U.S. patent application Se. Ser. No. 15/750,954 filed on Feb. 7, 2018, the entire disclosures of which are hereby incorporated by reference.

FIELD

The present disclosure relates to a wireless system for determining the displacement of spinning components, and more particularly, a wireless system for determining the displacement of gears in a locking differential.

BACKGROUND

Motor vehicles include multiple systems where it is beneficial to sense the position or state of a spinning or rotating components. For example, spinning components are used in locking differentials, axle disconnect systems and power take off units. Sensing the position or state of spinning components can be difficult. In locking differentials specifically, spinning gears can be moved in and out of engagement with other gears. The distance between the gears can be indirectly measured when the gears are engaged by measuring the effects of the engagement. However, in some arrangements, the conditions required to indirectly measure the effects of engagement may not always be met. Thus, the only definitive way to determine if the gears have engaged is to measure the distance traveled by the moving/spinning gear.

A current method for sensing the position of spinning components uses sensors mounted rigidly around the spinning component, and the sensors translate the movement of the spinning component to a non-spinning component. The translation from spinning to non-spinning introduces significant error and cost. For example, any run-out of the spinning component will appear to be small axial movements and, thus, added noise to the measured signal increasing error. These translating sensing systems also have several additional components, each that can add additional noise and cost to the system. Additionally, there is contact between a spinning component and a non-spinning components creating additional wear that decreases the life of the system and increases the cost of the system.

A potential solution is to embed the sensor with the spinning components, allowing the sensor to spin along with the components; however, difficulties arise in getting power to the sensor and transmitting the signal out of the sensor. Wired sensor systems do not work because the wires will quickly wrap around the spinning components.

Therefore, it would be desirable to have a wireless system that directly senses the displacement of the spinning component.

SUMMARY

A wireless system for determining the displacement of spinning components of a differential assembly includes a differential case having a hollow interior space, a differential assembly having an actuator including an electromagnet having a coil, a spinning component selectively engaged with a differential gear arrangement and at least one sensor assembly non-rotatably mounted to the differential case including at least one sensor communicatively coupled to a printed circuit board, a transmitter and a power source. The differential case houses the differential gear arrangement. A portion of the sensor assembly extends axially and radially within the differential case and at the least one sensor is located in the hollow interior space of the differential case and axially adjacent to the spinning component of the differential assembly. At least one sensor is configured to directly sense the axial displacement of the spinning component. The sensor assembly is configured to generate a signal representing the axial displacement of the spinning component. The transmitter is capable of wirelessly transmitting the signal to a receiver positioned outside the differential case.

BRIEF DESCRIPTION OF THE DRAWINGS

The above, as well as other advantages of the present embodiments will become readily apparent to those skilled in the art from the following detailed description when considered in the light of the accompanying drawings in which.

DETAILED DESCRIPTION OF THE PREFERRED EMBODIMENTS

It is to be understood that the embodiments may assume various alternative orientations and step sequences except where expressly specified to the contrary. It is also to be understood that the specific devices and processes illustrated in the attached drawings, and described in the following specification, are simply exemplary embodiments of the inventive concepts defined in the appended claims. Hence, specific dimensions, directions or other physical characteristics relating to the embodiments.

Figure 1:
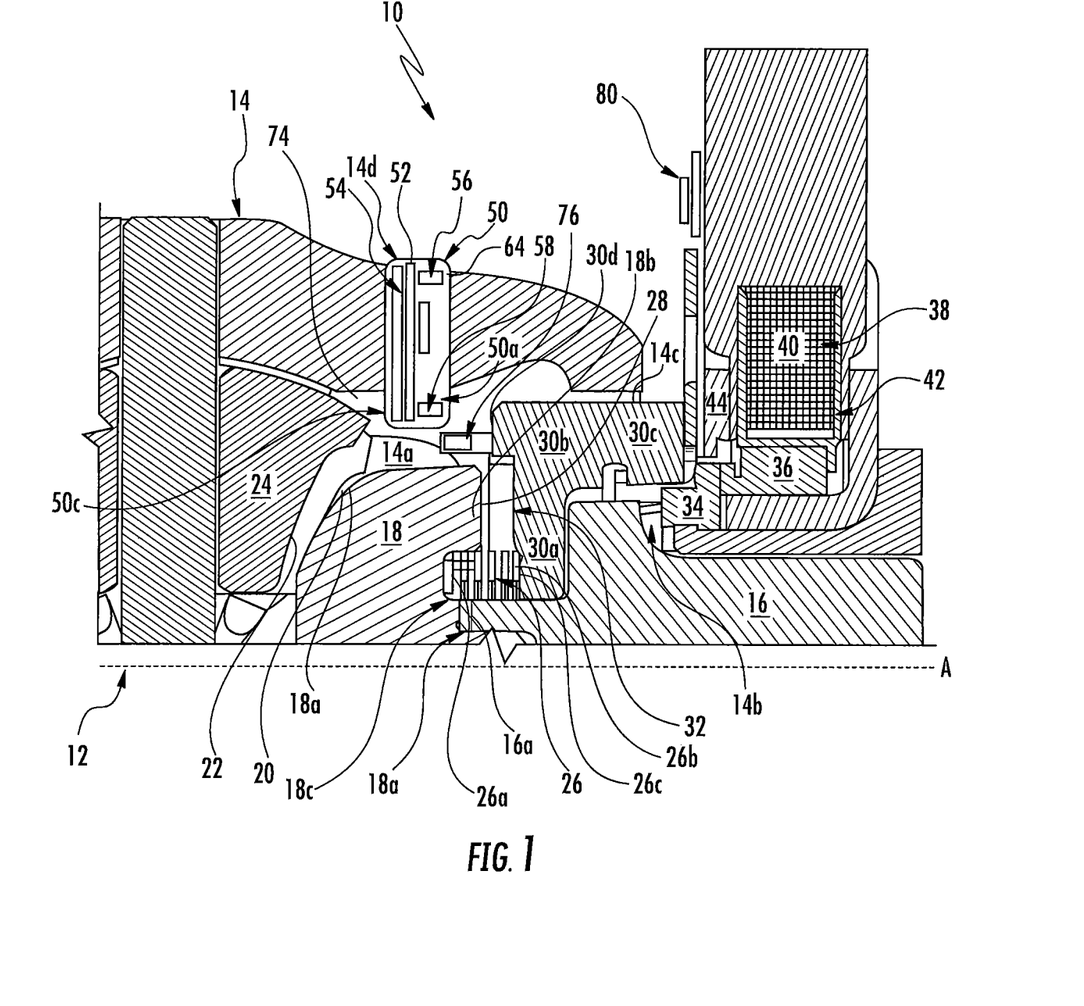
FIG. 1 is a cross-sectional view of a preferred embodiment of the wireless system in a locking differential.

Turning now to FIG. 1, one embodiment of a wireless system 10 for spinning components is depicted. The sensing system 10 is depicted in a locking differential assembly 12 to determine the axial position of the locking gear within a vehicle's locking differential assembly 12; however, the sensing system 10 may also be used in other systems including, but not limited to, power-take-off units, axle disconnect systems, etc.

As shown in FIG. 1, the differential assembly 12 includes a differential case 14. The differential case 14 is located in a differential housing (not shown) and is mounted for rotation in the differential housing. The differential case 14 includes a hollow interior space 14a.

A differential spider shaft 16 is located within the differential case 14. The spider shaft 16 extends across the hollow interior space 14a of the differential case 14. In one embodiment, an end portion 16a of the spider shaft 16 is secured within an aperture 14b of the differential case 14.

The differential assembly 12 includes a differential gear arrangement having a first differential side gear 18, a second differential side gear (not shown), a first differential pinion gear 24 and a second differential pinion gear (not shown). The first differential side gear 18 is mounted on the end portion 16a of the spider shaft 16 within the differential case 14. The differential case 14 houses the differential gear arrangement. As shown in FIG. 1, the spider shaft 16 can extend through an aperture 18a in the first differential side gear 18.

The first differential side gear 18 has a set of teeth 20 circumferentially there around. The differential side gear teeth 20 are in selective meshed engagement with a set of teeth 22 on the first differential pinion gear 24. The differential side gear teeth 20 are also meshed with teeth on the second differential pinion gear (not shown). The differential side gear teeth 20 are on a first side 18a of the first differential side gear 18. The first side 18a faces inwardly into the differential case 14.

The first differential side gear 18 has a second side 18b opposite the first side 18a. The second side faces outwardly. The second side 18b of the first differential side gear 18 has an axially extending pocket 18c extending into the first differential side gear 18. The pocket 18c receives a first end portion 26a of a biasing member 26 therein. The biasing member 26 may be, but is not limited to, a spring, a coil spring or a wave spring.

The second side 18b of the first differential side gear 18 also has a set of teeth 28. The teeth 28 are located radially above the biasing member 26.

A second end 26b of the biasing member 26 is in contact with a spinning component or cam ring 30. In one embodiment, the cam ring 30 has a radially inner interior portion 30a, a radially outer interior portion 30b and a radially outer exterior portion 30c. The radially outer interior portion 30b and the radially outer exterior portion 30c are generally axially aligned with one another. The biasing member 26 is in contact with the radially inner interior portion 30a of the cam ring 30.

The cam ring 30 also has a set of teeth 32 thereon. The teeth 32 are located on the radially inner interior portion 30a. More particularly, the teeth 32 are located radially above a contact point 26c of the biasing member 26 on the cam ring 30.

The radially inner interior portion 30a and the radially outer interior portion 30b of the cam ring 30 are both located within the differential case 14. The radially outer exterior portion 30c is located out of the differential case 14 and extends through an axial opening 14c in the differential case 14. The radially outer exterior portion 30c, the radially outer interior portion 30b and the radially inner interior portion 30a may be one piece, unitary and integrally formed, or may be of individual pieces that are connected together.

The radially outer exterior portion 30c of the cam ring 30 is in contact with an axially movable bushing 34. The bushing 34 is preferably a continuous, ring shaped structure. The bushing 34 may be constructed of a non-magnetic material, such as, but not limited to, plastic. In one embodiment, the bushing 34 is located radially inboard and axially outboard from the radially outer exterior portion 30c of the cam ring 30.

The bushing 34 is in contact with an axially movable slide collar 36. The slide collar 36 is constructed of a metallic material that is susceptible to magnetic forces including, but not limited to, steel. The slide collar 36 is located radially inboard of an electromagnet 38 of an actuator 46.

The electromagnet 38 includes a coil 40 and a coil housing 42. The coil housing 42 is hollow and encloses the coil 40. In one embodiment, the coil 40 includes multiple copper wire windings encased in a potting material within the coil housing 42. The wire windings of the coil 40 are connected to a source for electricity (not shown).

The coil housing 42 may be one piece or several pieces connected together. The coil housing 42 and the electromagnet 38 may be located on the differential case 14. The coil housing 42 may be stationary with respect to the rotating differential case 14. A bushing 44 may be located between the coil housing 42 and the differential case 14 to facilitate relative rotation between the two.

The slide collar 36 is located radially inward from the coil housing 42 and is in direct contact therewith. The slide collar 36 can have a complementary shape to the coil housing 42.

A sensor assembly 50 is located in the differential case 14. More particularly, a sensor assembly 50 may be located in an aperture 14d that extends through the differential case 14. In one embodiment, the aperture 14d is a radially extending aperture 14d extending through an outer wall of the differential case as shown in FIG. 1.

The sensor assembly 50 can include a printed circuit board (PCB) 52, a power source 54, a transmitter 56 and at least one sensor 58. The transmitter 56 can include an antenna and other additional components. In one embodiment, the PCB 52 can include a microcontroller. The PCB 52, power source 54, transmitter 56 and at least one sensor 58 can be located in a single housing 64, as shown in FIG. 1, or may be located in individual separate housings in or on the differential case 14.

As shown in FIG. 1, the sensor 58 can be a Hall effect sensor. Additionally, the sensor 58 can be a pressure sensor or a linear position sensor including, but not limited to, a resistive slide or a miniature linear variable differential transformer. In one embodiment, the sensor assembly 50 can include a Hall effect sensor and a pressure sensor.

Preferably, the sensor assembly 50 has an interior portion 50a that extends radially into the hollow interior 14a of the differential case 14. Preferably, the sensor 58 is positioned within the housing 64 or outside the housing 64 within the hollow interior of the differential case, axially adjacent the cam ring 30. The interior portion 50a is preferably located adjacent the radially outer interior portion 30b of the cam ring 30. The interior portion 50a may be axially located between the first differential side gear 18 and the cam ring 30 and radially located outboard of the differential pinion gear 24.

The sensor assembly 50 is preferably fixed in a non-rotating fashion to the differential case 14. The differential case 14 is rotatable and when the differential case rotates, the sensor assembly 50 rotates with the differential case 14. However, the sensor assembly 50 is mounted such that there is no relative rotation between the differential case 14 and the sensor assembly 50. Further, the sensor assembly 50 is fixed axially and radially within the differential case 14 for no relative movement with respect to the differential case 14.

Figure 2:
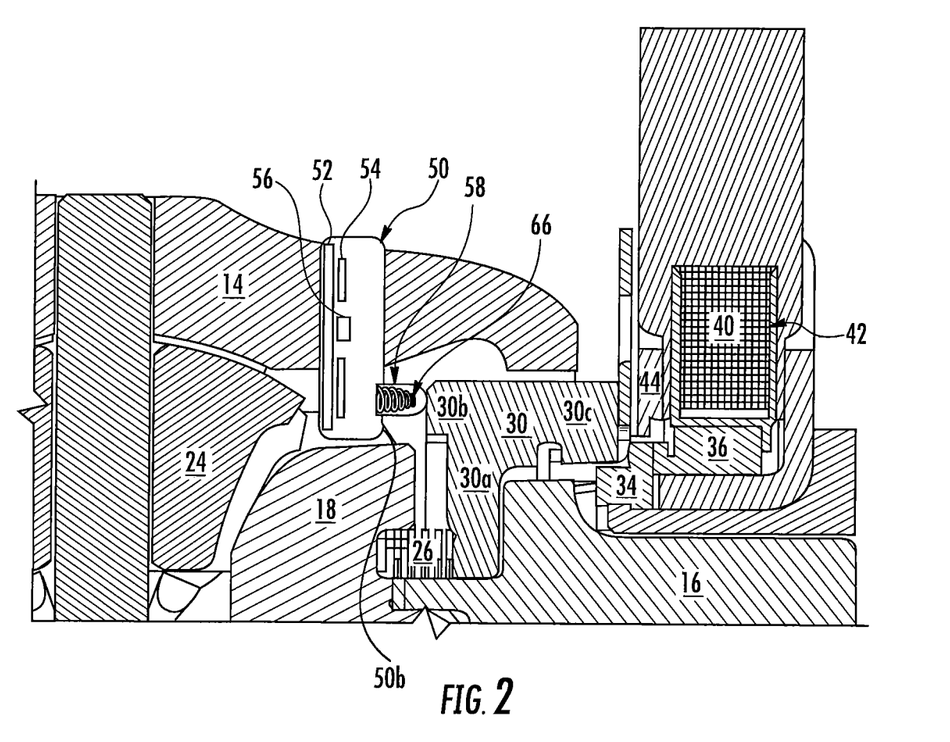
FIG. 2 is a cross-sectional view of another preferred embodiment of the wireless system in a locking differential in a disengaged state.

In one embodiment, the sensor assembly 50 includes a pressure sensor 58 extending from a side surface 50b as shown in FIG. 2. The pressure sensor 58 may include a biasing member 66, such as an elastomer or spring.

The pressure sensor 58 is designed to be in contact with the radially outer interior portion 30*b* of the cam ring 30. The pressure sensor 58 may be in constant contact with the cam ring 30, or it may be separated from the cam ring 30 by a closeable gap. In either case, the axial amount the biasing member 66 is moved or compressed by the cam ring 30 is sensed by the pressure sensor 58. The biasing member 66 absorbs the linear translation of the cam ring 30 and generates a proportional force on the pressure sensor 58. In one embodiment, the pressure sensor 58 is an SP37 450 kPa pressure sensor or similar. While this is one embodiment of a pressure sensor, other embodiments can include pressure sensors of other sizes and capacities.

The sensed displacement can be converted to a signal, such as through a PCB 52, transmitter 56 and other electronic components in the sensor assembly 50. The signal can then be wirelessly transmitted by the transmitter 56 from the sensor assembly 50 to a transceiver 70 and/or controller. In one embodiment, the signal may be sent through radio frequency transmissions or other frequencies.

In one embodiment, the sensor assembly 50 can include a Hall effect sensor 58 located thereon or therein. As shown in FIG. 1, the sensor 58 is located in the sensor assembly 50. More particularly, the Hall effect sensor 58 may be located in the radially innermost portion of interior portion 50*a* of the sensor assembly 50. The interior portion 50*a* of the sensor assembly 50 may be located radially outward from the differential pinion gear 24 so that a gap 74 exists between them.

A sensing element 76 is located on or in the radially outer interior portion 30*b* of the cam ring 30. One embodiment of the location, shape and size of the sensing element 76 is depicted in FIG. 1; however, other locations, shapes and/or sizes are possible.

The sensing element 76 can be a magnet. As shown in FIG. 1, the magnet 76 can be located on an inner side surface 30*d* of the radially outer interior portion 30*b* of the cam ring 30. The magnet 76 is located radially outward from the set of teeth 32 on the cam ring 30 and radially outward from the biasing member 26. It is also possible to locate the magnet 76 on a radially outer surface of the cam ring 30. Further, it is possible to locate the magnet 76 within the cam ring 30, such as within a depression or fully encased within the cam ring 30.

FIG. 1 depicts the magnet 76 in a substantially horizontal orientation. That is, it is horizontal with respect to an axis of rotation A of the differential. The magnet 76 may also be oriented in a substantially vertical orientation with respect to the axis of rotation A. The magnet 76 may also be oriented at an angle, such as at a 45-degree angle, with respect to the rotational axis A.

The wireless system 10 may also include a receiver/demodulator 80. In FIG. 1, the receiver/demodulator 80 is depicted as located on the coil housing 42. More particularly, the receiver/demodulator 80 is located at a distance from the cam ring 30 or the differential case 14 so that a gap exists between the magnet 76, the sensor assembly 50 and the receiver/demodulator 80. The receiver/demodulator 80 may also be located on the differential housing or elsewhere in the vehicle. Alternatively, the receiver/demodulator 80 can be integrated into other existing vehicle electronics, such as the tire inflation system for the vehicle.

The sensing step, signal creation, any operations by the printed circuit board 52 and the signal transmission can be powered by the power source 54 located in the sensor assembly 50. The power source 54 can be a rechargeable power source. In one embodiment, the power source 54 is a battery. More particularly, the power source 54 is a battery that does not need to be replaced for the life of the vehicle.

Power consumption from the power source 54 can be controlled by permitting the sensor assembly 50 to be placed into a sleep mode when it is not needed, such as when the vehicle is turned off or when the specific system is inactive.

The controller (not depicted) can signal the sensor assembly 50 and/or power source 54 to "sleep". In one embodiment, a wireless controller is part of the receiver/demodulator 80 and/or is in communication with sensor assembly 50 can signal the sensor assembly 50 and/or power source 54 to sleep. When the vehicle is turned back on or the wireless system 10 is activated, the controller can signal the sensor assembly 50 and/or power source 54 to turn back on.

The controller and/or transceiver 70 can be located on the differential housing or elsewhere in the vehicle. Alternatively, the controller and/or the transceiver 70 can be integrated into other existing vehicle electronics, such as the vehicles tire inflation system.

The wireless system 10 permits a signal indicating whether the differential is engaged or disengaged to be accurately and instantaneously determined and signaled to the controller. The controller is communicatively coupled the sensor assembly 50. The controller receives signals generated by the sensors 58 and processes the received signals to determine the axial displacement of the spinning component. More particularly, the wireless system 10 determines the position of the cam ring 30 to determine whether it is engaged or disengaged with the differential side gear 18.

The differential assembly 12 has two modes of operation. In a first mode of operation, the differential assembly 12 is not locked as depicted in FIG. 2. The teeth 32 of the cam ring 30 and the differential side gear 18 are not engaged with one another. Instead, there is a gap between the teeth of the cam ring 30 and the differential side gear 18. This mode permits the differential side gears and pinion gears to rotate with respect to one another.

Figure 3:
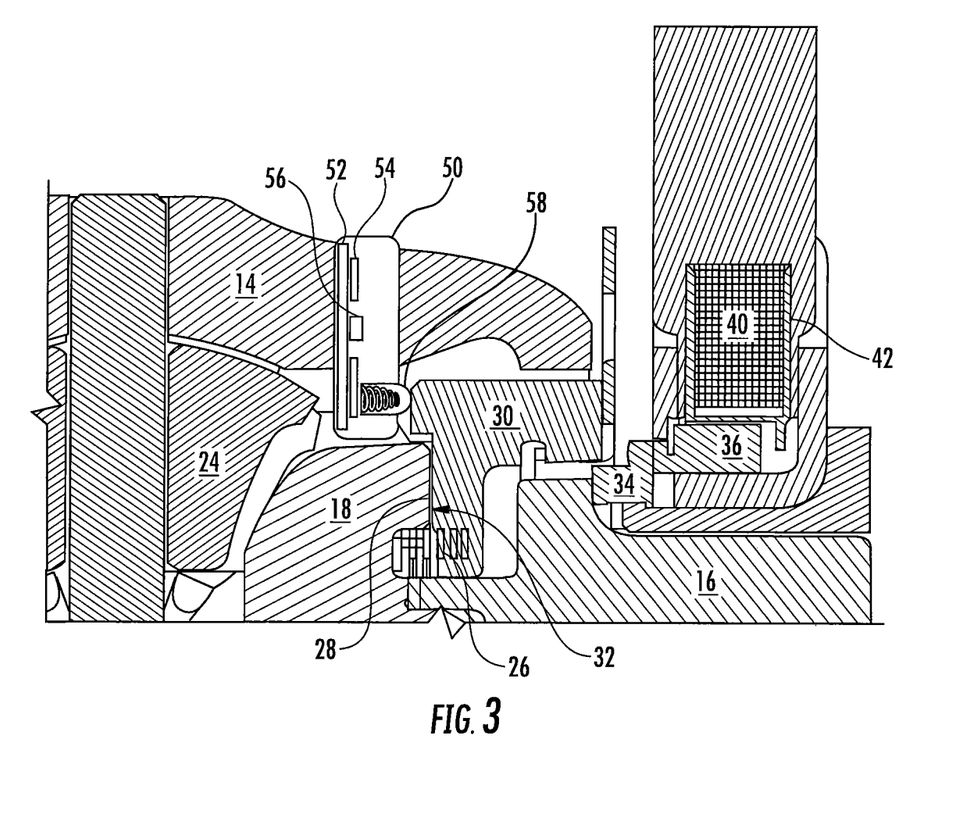
FIG. 3 is a cross-sectional view of the wireless system of FIG. 2 in a locking differential in an engaged state.

The second mode of operation begins with electricity being sent to the coil 40 and the coil wires create a magnetic flux. The current in the coil 40 causes the coil housing 42 to become magnetized. The sum of the coil 40 flux and the coil housing 42 magnetism is greater than the sum of the spring force from the biasing member 26 between the cam ring 30 and the differential side gear 18 and friction force of the slide collar 36, which causes the slide collar 36 to move, as shown in FIG. 3.

Within a few milliseconds of the coil 40 being energized, the magnetic flux causes the slide collar 36 to move in the inboard axial direction. The slide collar 36 axially moves the bushing 34, which in turn axially moves the cam ring 30 in the inboard axial direction. The cam ring 30 axially moves into the differential side gear 18 causing the cam ring teeth 32 to engage with the matching side gear teeth 28.

In an embodiment where the sensor assembly 50 includes a pressure sensor 58, as the cam ring 30 moves, it compresses the biasing member 26, increasing pressure on the sensor 58. The sensor 58 processes the new axial position of the cam ring 30 and communicates to the transceiver 70.

In an embodiment where the sensor assembly includes a Hall effect sensor 58, the inboard axial movement of the cam ring 30 moves the magnet 76 in the same direction. When the side gear teeth 28 and the cam ring teeth 32 are engaged, such as fully engaged, the magnet 76 is located radially adjacent, such as at least radially beneath the sensor 58. A radially gap exists between the sensor assembly 50 and the magnet 76 so that the two are not in physical contact with one another. The sensed magnet 76 can be converted to a signal, such as through a printed circuit board 52 and/or other electronic components in the sensor assembly 50. The signal can then be wirelessly transmitted from the sensor assembly 50 to the receiver/demodulator 80. The signal may be sent such as through radio frequency transmissions, or other frequencies, or through inductive coupling.

The sensing step, signal creation, any operations by the printed circuit board 52 and the signal transmission can be powered by the power source 54 located in the sensor assembly 50.

The above-described wireless system 10 permits a signal indicating whether the differential assembly 12 is engaged or disengaged to be accurately and instantaneously determined and signaled to the controller. More particularly, the wireless system 12 determines the axial displacement of the cam ring 30 to determine whether it engages or disengages with the differential side gear 18.

When it is no longer desired for the differential assembly 12 to be in the engaged position, the electricity is removed from the coil 40. The biasing member 26 biases the cam ring 30 away from the differential side gear 18, thus, separating the two.

Figure 4:
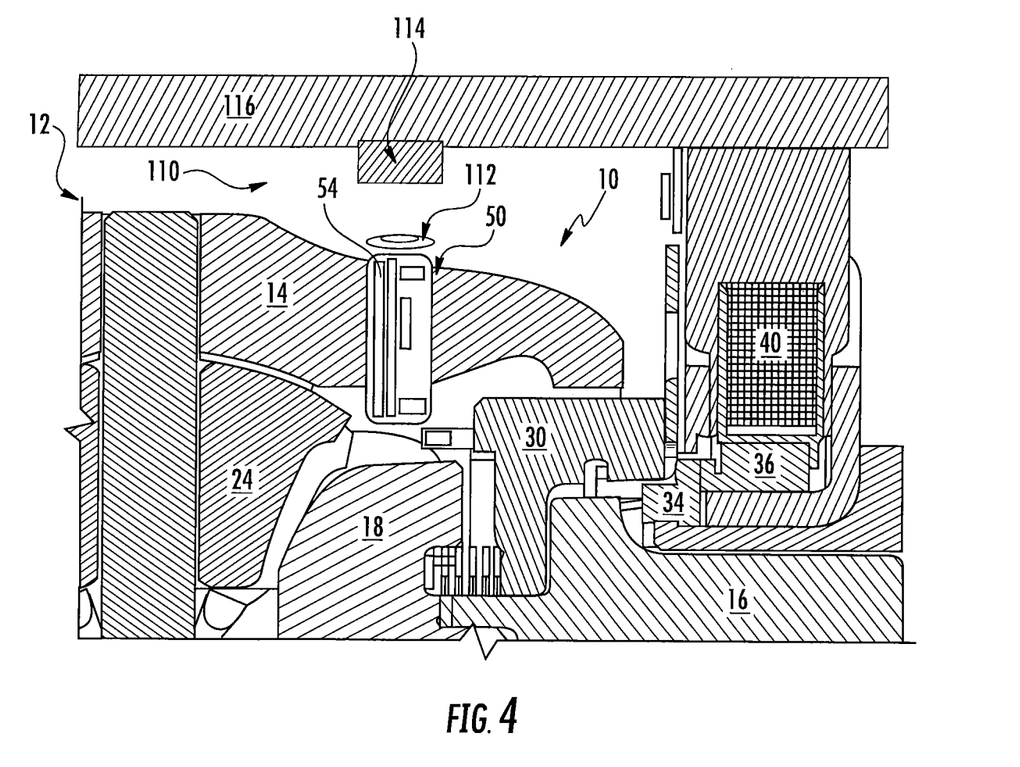
FIG. 4 is a cross-sectional view of another preferred embodiment of the wireless system in a locking differential.

In one embodiment, as shown in FIG. 4, the power source 54 can include an energy generation system 110 for the sensory assembly 50 with above-described system. The energy generation system 110 may be always employed, selectively used, or used entirely on its own without the above-described wireless system 10. For example, the wireless system 10 can include the power source 54 that may be used when the vehicle is not moving or the differential is not rotation, but the energy generation system 110 may be used at all other times. The energy generation system 110 may be connected to the power source 54 in the sensor assembly 50, a battery outside of the sensor assembly 50 and/or a capacitor located in or adjacent the sensor assembly 50.

In one embodiment, as depicted in FIG. 4, the energy generation system 110 includes a coil 112, such as a metal coil of wires, located in or on the differential case 14. The coil 112 can be fixed with respect to the differential case 14 and rotates with it. The coil 112 is electronically connected to the power source 54 of the sensor assembly 50. Preferably, the coil 112 is located adjacent, on or in the sensor assembly 50 so that an energy efficient, relatively short and inexpensive electrical connection can be made.

The energy generation system 110 also includes a magnet 114 located in or on a stationary housing 116. The stationary housing 116 is radially outward from the differential case 114. The coil 112 and the magnet 114 are preferably located proximate on another. In one embodiment, the coil 112 and magnet 114 are located radially and axially aligned with one another, but may also be offset from one another in either the radial or axial direction.

As the differential case 14 selectively rotates within the housing 116, the coil 112 rotates by the magnet 114. Rotation of the coil 112 by the magnet 114 generates an electric current in the coil 112. The current can be provided to the power source 54 to assist in the maintaining the power source 54 or effectively replacing the power source 54 if needed.

FIG. 4 depicts the energy generation system 110 including one coil 112 and magnet 114; however, the energy generation system 110 can include a plurality of coils and/or magnets. The additional coils/magnets can be used depending on the electrical power generating needs of the overall wireless system 10. By the way of example only, one embodiment may include single magnet 114 located as described above, and then a plurality of spaced apart coils located as described above. The coil 112 or coils can generate electricity when magnetic flux goes through and around the coil 112.

In another embodiment, the energy generation system 110 can include a small weight and magnet that rotate about a spider shaft 16 or other structure. The weight and magnet are connected to each other, preferably directly attached to one another. The weight is connected to the differential case 14 and selective rotation of the differential case 14 imparts rotation to the weight. The inertia of the moving weight causes the magnet to pass adjacent to, or directly over or about, the coil 112. The magnet thus generates an electric current in the coil 112. The current can be provided to the power source or battery 54 to assist in maintaining the battery 54 or effectively replacing the battery 54 if needed. It can be appreciated that more than one weight/magnet system may be used to generate the electrical power needed for the system.

Figure 5:
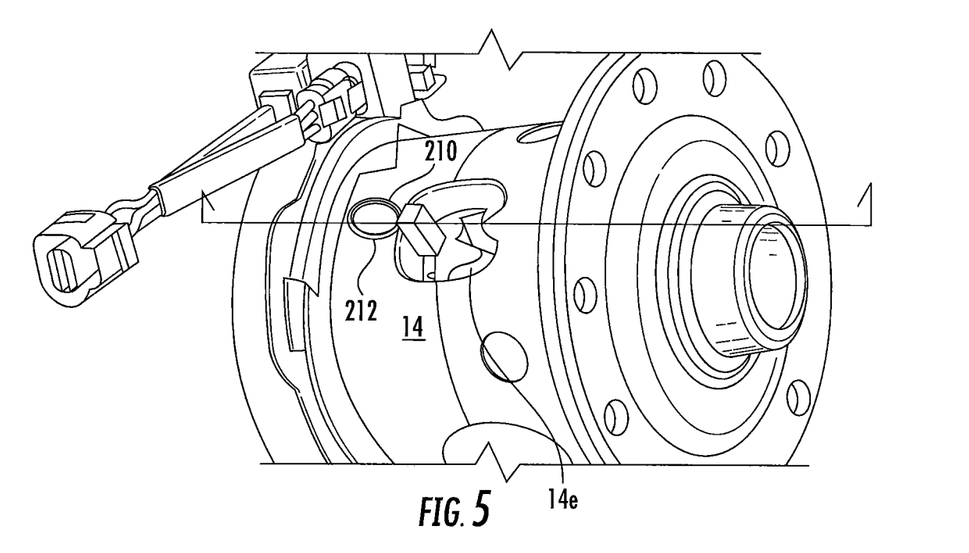
FIG. 5 is a perspective of another preferred embodiment of the wireless system in a locking differential.
Figure 6:
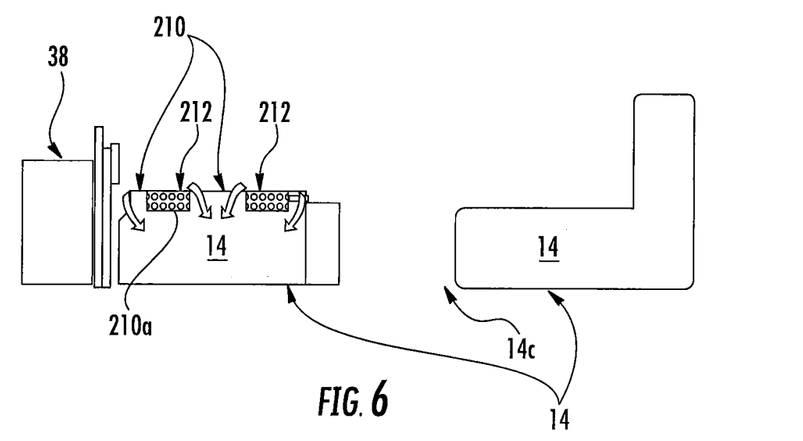
FIG. 6 is a detailed view of the energy generations system of the wireless system of FIG. 5.

In one embodiment, as shown in FIGS. 5 and 6, the differential case 14 may include flux path features 210 formed integrally in the differential case 14 to provide a flux path. The flux path features 210 can be integrally formed, one piece and unitary with the differential case 14, and/or can be separately attached. The flux path features 210 can be constructed out of an electrically conductive material including, but not limited to, steel.

While FIGS. 5 and 6 show one embodiment of the flux path features 210, the flux path features 210 may be of various shapes and sizes and the location of the flux path features 210 in relation to the differential case 14 can vary. FIGS. 5 and 6 depict a portion of the differential case 14 with the flux path features 210 located adjacent the electromagnet 38. In this embodiment, the sensor assembly 50 is located in an axial opening 14e in the differential case 14 from the cam ring 30 as shown in FIG. 5. The flux path features 210 of the differential case 14 are located between the electromagnet 38 and the sensor assembly 50.

The flux path features 210 may include a curvilinear groove 210a in which a coil 212 is placed. The groove 210 is shown as circular or oval with a constant depth and width, but other shapes and dimensions are permissible. The coil 212 can be placed in the groove 210a so that the upper surface of the coil 212 is flush with the outer surface of the differential case 14 as shown in FIG. 6. The flux path is depicted by arrows in the differential case 14 in FIG. 6.

Figure 7A:
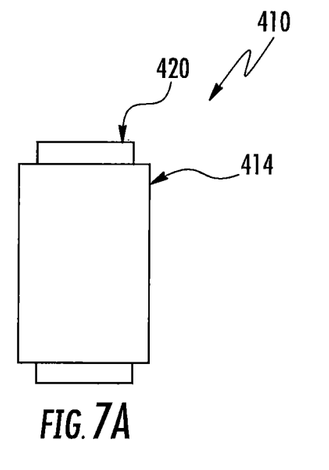
FIGS. 7a-b are schematic views of a shaker-type energy generation system.
Figure 7B:
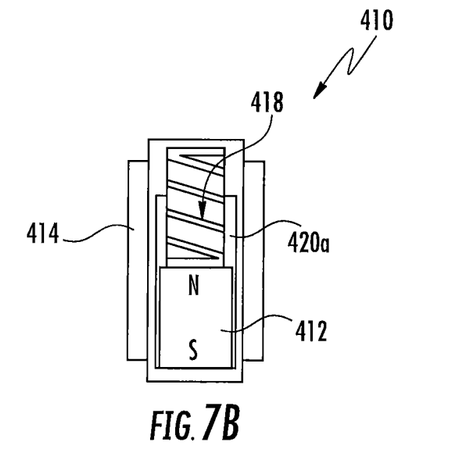

In another embodiment, the energy generation system can use inertia generated within the system to move a mass and create electricity. In this embodiment, the energy generation system 310 is a shaker-type energy generation system as depicted in FIGS. 7a-b. The shaker-type energy system 310 includes a magnet 312 that selectively moves, such as axially, within a coil 314 of wire that at least partially surrounds the magnet 312. The coil 314 is connected to the power source 54 to assist in maintaining the power source 54 or effectively replacing the power source 54 if needed. A biasing member 318 including, but not limited to, a spring, can be used to selectively located the magnet 312 in a home position.

The biasing member 318 is located within a housing 320 that houses the magnet 312 as shown in FIG. 7b. The biasing member 318 may be located on one side of the magnet 312, but other locations and arrangements are permissible. The magnet 318 is permitted to slide in a larger diameter section 320a of the housing 320 compared with the section of the housing the houses the biasing member 318 as shown in FIG. 7b.

The energy generation system 310 is connected to the differential case 14 so that for a predetermined amount of acceleration and/or declaration of the differential case 14, the magnet 312 compresses the biasing member 318 and an electric current is generated by virtue of the movement of the magnet 312 in the coil 314.

The energy generation system 310 may located on the differential case 14, partially within the outer wall of the differential case 14, completely within the outer wall of the differential case 14 or within the differential case 14.

It can be appreciated that any number of the shaker-type energy systems 310 can be used based on the electrical power needs of the wireless system 10.

In accordance with the provisions of the patent statutes, the present invention has been described in what is considered to represent its preferred embodiments. However, it should be noted that the embodiments can be practiced otherwise than as specifically illustrated and described without departing from its spirit or scope.

We claim:

1. A wireless sensing system, comprising:
   a differential assembly; and
   at least one sensor assembly coupled to the differential assembly, the at least one sensor assembly is configured to generate a signal representing a parameter of the differential assembly, wherein the differential assembly and the at least one sensor assembly are wireless.

2. The wireless sensing system of claim 1, wherein the at least one sensor assembly is coupled to the differential assembly such that the at least one sensor assembly rotates with a differential case of the differential assembly.

3. The wireless sensing system of claim 1, wherein the at least one sensor assembly includes a transmitter configured to wirelessly transmit the signal representing the parameter of the differential assembly.

4. The wireless sensing system of claim 1, wherein the parameter of the differential assembly is a linear displacement of a spinning component of the differential assembly.

5. The wireless sensing system of claim 1, wherein the parameter of the differential assembly is an axial displacement of a cam ring of the differential assembly.

6. The wireless sensing system of claim 1, further comprising at least one of a transceiver, a controller, a receiver, and a demodulator, wherein at least one of the transceiver, the controller, the receiver, and the demodulator is configured to receive the signal representing the parameter of the differential assembly.

7. The wireless sensing system of claim 6, wherein at least one of the transceiver, the controller, the receiver, and the demodulator is one of coupled to the differential assembly and integrated into a vehicle electronics system.

8. The wireless sensing system of claim 1, wherein the at least one sensor assembly includes a power source, wherein the power source includes at least one of a rechargeable power source, a battery, and an energy generation system.

9. The wireless sensing system of claim 1, wherein the at least one sensor assembly includes at least one of a Hall effect sensor, a linear position sensor, and a pressure sensor.

10. The wireless sensing system of claim 1, wherein the at least one sensor assembly includes at least one magnet disposed within the differential assembly.

11. The wireless sensing system of claim 10, wherein the parameter of the differential assembly is a displacement of the at least one magnet disposed within the differential assembly.

12. The wireless sensing system of claim 6, wherein at least one of the transceiver, the controller, the receiver, and the demodulator is in communication with the at least one sensor assembly to selectively activate and deactivate the at least one sensor assembly.

13. The wireless sensing system of claim 3, wherein the transmitter uses frequency transmissions to transmit the signal representing the parameter of the differential assembly.

14. A method of wireless sensing, comprising:
    providing a wireless sensing system including a differential assembly and at least one sensor assembly coupled to the differential assembly; and
    generating a signal representing a parameter of the differential assembly.

15. The method of claim 14, further comprising:
    transmitting the signal representing the parameter of the differential assembly from the at least one sensor assembly to at least one of a transceiver, a controller, a receiver, and a demodulator.

16. The method of claim 15, wherein the signal representing the parameter of the differential assembly is wirelessly transmitted by a transmitter from the at least one sensor assembly to at least one of the transceiver, the controller, the receiver, and the demodulator.

17. The method of claim 16, wherein the transmitter uses frequency transmissions to transmit the signal representing the signal representing the parameter of the differential assembly.

18. The method of claim 14, further comprising:
    determining whether the differential assembly is in one of an engaged position and a disengaged position based upon the signal representing the parameter of the differential assembly.

19. The method of claim 14, further comprising:
    selectively activating and deactivating the at least one sensor assembly utilizing at least one of a transceiver, a controller, a receiver, and a demodulator.

20. The method of claim 14, wherein the parameter of the differential assembly is a displacement of at least one of a spinning component and at least one magnet disposed within the differential assembly.

* * * * *